Patented Sept. 12, 1933

1,926,867

UNITED STATES PATENT OFFICE 1,926,867

COMPOSITE PRODUCT AND METHOD OF MAKING

Harry L. Fisher, Leonia, N. J., assignor to The Naugatuck Chemical Company, Naugatuck, Conn., a corporation of Connecticut No Drawing. Application August 9, 1930
Serial No. 474,298

21 Claims. (Cl. 18—59)

This invention relates to a composite product and the method of making the same, more particularly to a composite product formed of integrally united rubber and metal and a method of making the same.

In the chemical and other arts there has been difficulty in the manufacture of suitable containers and shipping receptacles for various corrosive liquids and other materials. In some cases the containers are made of glass or other material unattacked by the corrosive liquids, but in the case of glass the material is quite fragile and unsuited for large receptacles or for transportation purposes, and many of the other expedients used are too expensive. As a result attempts have been made to use receptacles and tank cars made of steel or iron and to line them with rubber, but difficulty has been encountered in obtaining a bond between the rubber and metal which is at the same time strong and unaffected by conditions met during use, such as high temperatures, and which is also economical to produce and simple to make.

A further use in the arts for composite rubber and metal articles is in cases where the articles are exposed to corrosive gases, such as parts of blower or exhaust systems, and in cases where metal is lined with rubber to prevent abrasion of the metal, as in rubber lined metal chutes and in conveyor buckets and various other parts of conveying systems handling abrasive materials.

One method of uniting rubber to iron or steel is to plate the metal with brass, apply an unvulcanized rubber cement compounded to form hard rubber, and then superpose the rubber lining and vulcanize. This method is not of general application, is unsuitable for the lining of receptacles, and a further objection is that a relatively long time and high temperature are required to vulcanize the hard rubber cement and there is a tendency to over-vulcanize the adjacent soft rubber by reason of the migration of sulphur from the hard rubber cement. Another method used is to unite the metal and rubber by means of certain thermo plastic materials, and while good bonds at ordinary temperatures are obtained in such case, the thermoplastic softens under heat and the bond is then weakened. Hence, this method is not applicable in the case of receptacles or other articles subjected to high temperatures.

An object of the present invention, therefore, is to provide a composite article of metal and rubber in which the materials are integrally united, in which the bond between the materials is sufficient to withstand any strains to which the article may be subjected during use, and in which the bond is not thermoplastic and hence will not tend to soften and weaken when the article is subjected to high temperatures. A further object is to provide a method, for producing composite rubber and metal articles, which will be cheap and simple to carry out and which will ordinarily require no special apparatus but can be effected by the ordinary means used for vulcanizing rubber articles.

I have discovered that by mixing certain rubber products which in themselves have little or no bonding strength and interposing a layer of this composition between bodies of metal and rubber which it is desired to integrally unite, and then exposing the combination to a vulcanizing heat, a composite metal and rubber article is obtained which has all of the desired properties of good bonding strength between the rubber and metal, which is not substantially affected by relatively high temperatures, and which can be made cheaply and with the use of ordinary vulcanizing apparatus. The combination is further improved by the addition of certain organic softening agents and accelerators.

As an illustration of the invention, there may be prepared a mixture composed of a solution of hard rubber or a rubber of the hard rubber type and a solution of rubber vulcanized to a less degree of combined sulphur, and this mixture is then applied to the cleaned surface of a metal body such as of steel or of iron, and after drying a sheet or other body of vulcanizable or vulcanized rubber may be applied to the dried deposit and the composite article then subjected to a vulcanizing heat. Both the solution of hard rubber and the solution of rubber vulcanized to a less degree of combined sulphur may be prepared in a manner similar to that described in patent to Gibbons et al. No. 1,745,533, issued February 4, 1930. In the first example in this patent, it is stated that soft vulcanized rubber may be dissolved by heat in a suitable solvent, such as solvent naphtha, sufficient sulphur added to produce hard rubber and the solution then heated until the rubber contains more than 15% of combined sulphur and substantially no free sulphur, and in this specific example, it is stated that the reaction will require 2½ hours at a temperature of approximately 163° C. The patent also states that lower temperatures may be used with a correspondingly longer time, and as examples the solution may be heated for 8 hours at a temperature corresponding to 90 pounds steam pressure, or for 48 hours at 35 pounds steam pressure. The solution of hard rubber thus obtained may then be mixed with a similar solution which has been vulcanized to a less degree of combined sulphur. For instance, there may be used the product obtained by heating the solution of soft vulcanized rubber with sulphur for 2 hours at 35 pounds steam pressure, which product will hereafter be known as No. 1, or there may be used the product obtained by heating the solution of soft vulcanized rubber with sulphur for four hours at 35 pounds steam pressure, which latter product will hereafter be known as No. 2. If desired, the solution of hard rubber may be mixed with the initially used solution of soft vulcanized rubber without the addition of any further sulphur to the latter. This solution of soft vulcanized rubber may be prepared under the time and temperature conditions specified in the patent to Gibbons et al., that is, by heating the soft vulcanized rubber, such as inner tube scrap, in a kettle with a solvent such as high flash naphtha for two to three hours at approximately 163° C. or instead it may be prepared by heating the scrap and solvent for 16 hours at a temperature corresponding to 35 pounds steam pressure. The solution of soft vulcanized rubber containing no further added sulphur will hereafter be referred to as product No. 3.

When mixing the solution of hard rubber and the solution of rubber vulcanized to a less degree of combined sulphur, the dilution of the solutions may be varied according to conditions, but approximately 10 to 25% solids has been found to be suitable in most instances. The hard rubber solution and the solution of rubber vulcanized to a less degree of combined sulphur may be mixed in different proportions, but proportions varying from 8 to 1 down to 1 to 1 have been found most suitable when bonding rubber to metal, and the composite rubber-metal articles thus obtained have given pulls up to 100 pounds. While it is preferred to use a rubber solution the rubber of which has 15% or more combined sulphur, as that ingredient of the composition which has the higher ratio of combined sulphur, the invention is not limited to such use, and there may be employed instead a rubber solution which has a less proportion of combined sulphur as long as it approximates the hard rubber type.

A standard test for measuring the pull is to apply the composition to a piece of cleaned metal, then apply a vulcanizable compound which has been calendered on the ordinary fabric used in tire construction, and vulcanize. The fabric is used in the rubber compound merely to prevent stretching of the rubber during the stripping test and thereby insure accuracy in the pull figures obtained. In carrying out the stripping test, a strip one inch wide, and extending inwardly from an edge of the composite rubber-metal article, is marked out on the rubber stock and the latter is then cut through on the marked lines to the surface of the metal. The one inch wide strip thus formed is loosened at the edge of the metal article and the loosened end and the metal beneath it are fastened in the grips of a testing machine and the rubber strip pulled downward, the number of pounds of pull required to separate the rubber from the metal being indicated by the machine.

As specific examples of the invention, the following are given:

*Example 1.*—Using a mixture of the hard rubber solution and the No. 2 product before mentioned, in proportions varying from 6 to 1 to 8 to 1, the pull obtained was between 50 and 52 pounds when an ordinary tire tread stock was used.

*Example 2.*—Using a mixture of the hard rubber solution and a solution of product No. 1, previously described, on a tread stock, a pull of 27 pounds was obtained using a 4 to 1 ratio of the solutions; a pull of 26 pounds was obtained using a 3 to 1 ratio; and a pull of 24 pounds was obtained with a 2 to 1 ratio; while with a 7 to 1 ratio a pull of 42 pounds was obtained.

*Example 3.*—Using a mixture of the hard rubber solution and the solution of soft vulcanized rubber, previously referred to as product No. 3, a 6 to 1 mixture with a tire tread stock gave a pull of 27 pounds, while a 4 to 1 mixture with a tread stock gave a pull of 24 pounds. Using a tire carcass stock, a 2 to 1 mixture gave 17 pounds pull.

In all of the examples given, the cure of the composite rubber-metal article was in a press, and unless otherwise specified the cure for a tread stock was 75 min. at 40 pounds steam pressure and for a carcass stock 60 min. at 40 pounds steam pressure.

If desired, a vulcanized stock may be used instead of a vulcanizable one and in this case the curing time required to produce a good bond is very much lessened under the same temperature conditions.

In applying the bonding mixture to the metal, the latter may be cleaned in any suitable manner as by sand blasting or by the use of a suitable pickle, and the bonding mixture then applied in any suitable way such as by pouring, spraying or spreading. The bonding mixture is then allowed to dry and the rubber stock applied and rolled down. While the invention is particularly applicable to the uniting of rubber to ferrous metals, such as iron or steel, it has also given good results with other metals such as aluminum and brass.

As showing that the bond of the composite article is not affected by high temperatures, a test was made using as the bonding material a mixture of the hard rubber solution and the No. 2 product before described, and after vulcanizing, the bond between iron and a tire tread stock was excellent under high temperatures. After 16 hours heat at 212° F. a pull of 49 pounds was obtained on the composite material immediately after it was removed from the oven, and a pull of 50 pounds was obtained when tested cold.

Further improvement is caused by adding to the bonding composition certain organic softening agents, among which may be mentioned aniline, dimethylaniline, cyclohexanol, cyclohexanone, nitrobenzene, methylsalicylate, cumar resin, liquid factice, BRV, which is a product made by the Barrett Company, and is a liquid high boiling coal tar distillate consisting chiefly of aromatic hydrocarbons, specific gravity above 1.130 at 38° C. and boiling practically all above 300° C., and paraflux (a product of the C. P. Hall Company), which is an especially purified residue obtained in the cracking of petroleum for gasoline and is made according to U. S. Patent No. 1,611,436, granted to Charles P. Hall. As examples, a mixture of the hard rubber solution and the No. 2 product gave the following results with various softeners, the products being used in a ratio of two parts to one and in a concentration of about 10%.

Adding one half part of liquid factice, the composite article gave a pull of 58 pounds in the case of a rubber tire carcass stock on iron, and a pull of 88 pounds in the case of a tread stock on iron.

Adding one half part of a 10% solution of cumar resin, a pull of 96 pounds was obtained with a tread stock.

Adding 2 parts of a 10% solution of paraflux a pull of 94 pounds was obtained with a tread stock, and with one half part of paraflux, a pull of 29 pounds was obtained with a carcass stock and 80 pounds with a tread stock.

Adding one half part of BRV a pull of 97 pounds was obtained with a tread stock, while with one part of BRV, a pull of 108 pounds was obtained and with two parts a pull of 125 pounds.

It has also been found that when both a softener and an organic accelerator are employed in combination with the mixture of the two rubber solutions, improved results are obtained over the mixture of rubber solutions alone.

A mixture of the hard rubber solution, the No. 2 product, BRV, the vulcanization accelerator triethyltrimethylenetriamine combined with stearic acid, and zinc oxide, in the respective proportions of 10 cc., 5 cc., 0.5 grams, 0.05 grams, and 0.03 grams, gave a pull with a carcass stock of 44 pounds, and with a tread stock of 76 pounds.

A mixture of the same two rubber solutions with aniline and tetramethyl thiuram disulphide in the respective proportions of 12 cc., 6 cc., 2 cc., 0.009 grams, gave a pull with a carcass stock of 72 pounds and with a tread stock of 76 pounds. A mixture of the same two rubber solutions with dimethylaniline and tetramethyl thiuram disulphide in the same respective proportions gave a pull with a carcass stock of 66 pounds and with a tread stock of 114 pounds. The same two rubber solutions with cyclohexanol and tetramethyl thiuram disulphide in the same respective proportions gave a pull with a carcass stock of 56 pounds and with a tread stock of 102 pounds. The last four examples also gave excellent results in the lining of barrels and tanks using stocks compounded to cure in exhaust steam and cured for 24 hours. Due to the fact that these stocks contained no reinforcement of fabric, no machine stripping tests were made as the stretching of the rubber renders such tests unreliable.

As showing that the remarkable results obtained in the bond are due to the combination of materials and not to the individual ingredients, it is pointed out that where a test was made using the hard rubber solution containing 15% or more of combined sulphur to bond iron to a carcass stock and cured for 45 min. at 40 pounds steam pressure in a press, the pull was only a half pound, and the same results were obtained with a tread stock. Using the rubber solutions designated as Nos. 1 and 2 under the same conditions as above pointed out, there was obtained only a pull of 3 to 7 pounds with a carcass stock and two pounds with a tread stock. Using the rubber solution designated as No. 3, the pull was only 7 pounds with a carcass stock and 3 pounds with a tread stock. Moreover, the bonding effect of the mixture of the two materials is relatively low prior to vulcanization.

It will be seen that by the invention, a composite rubber and metal article can be made cheaply and with the use of ordinary apparatus, and the rubber and metal are firmly bonded together and the bond is not noticeably affected by a rise in temperature.

While specific examples have been given of the invention, it is obvious that changes may be made therein, and it is not desired to limit the invention otherwise than as set forth in the appended claims.

Having thus described my invention what I claim and desire to protect by Letters Patent is:

1. An integrally united composite body resulting from the vulcanization of, a body of metal, a body of rubber, and an intermediate layer comprising the deposit from a mixture of rubber solutions vulcanized to substantially different degrees of combined sulphur.

2. An integrally united composite body resulting from the vulcanization of, a body of metal, a body of rubber, and an intermediate layer comprising the deposit from a mixture of products resulting from further vulcanizing solutions of soft vulcanized rubber in the presence of additional sulphur to substantially different degrees of combined sulphur.

3. An integrally united composite body resulting from the vulcanization of, a body of ferrous metal, a body of rubber, and an intermediate layer comprising the deposit from a mixture of products resulting from further vulcanizing solutions of soft vulcanized rubber in the presence of additional sulphur to substantially different degrees of combined sulphur, the product having the higher proportion of combined sulphur predominating.

4. An integrally united composite body resulting from the vulcanization of, a body of ferrous metal, a body of rubber, and an intermediate layer comprising the deposit from a mixture of a solution of hard rubber and a solution of rubber vulcanized to a substantially less degree of combined sulphur.

5. An integrally united composite body resulting from the vulcanization of, a body of ferrous metal, a body of rubber, and an intermediate layer comprising the deposit from a mixture of products resulting from further vulcanizing solutions of soft vulcanized rubber in the presence of additional sulphur, one of said products having substantially 15% of combined sulphur and the other a solution of soft vulcanized rubber vulcanized in the presence of sulphur to a substantially less degree of combined sulphur.

6. An integrally united composite body resulting from the vulcanization of, separated bodies of material at least one of which is metallic, and an intermediate layer comprising the deposit from a mixture of rubber solutions one of which is vulcanized to at least 15% of combined sulphur and the other of which is a solution of soft vulcanized rubber vulcanized in the presence of sulphur to a degree of combined sulphur equivalent to that resulting from heating it for four hours at thirty-five pounds steam pressure.

7. A method of uniting metal to rubber which comprises applying to the metal a mixture of solutions of rubber vulcanized to substantially different degrees of combined sulphur, drying, applying a body of rubber, and vulcanizing the combination.

8. A method of uniting metal to rubber which comprises applying to the metal a mixture of products resulting from further vulcanizing solutions of soft vulcanized rubber in the presence of additional sulphur to substantially different degrees of combined sulphur, drying, applying a body of vulcanizable rubber, and vulcanizing the combination.

9. A method of uniting metal to rubber which comprises applying to a ferrous metal a mixture of products resulting from further vulcanizing in the presence of additional sulphur a solution of soft vulcanized rubber substantially to a hard rubber type and another solution to a substantially less degree of combined sulphur, drying, applying a body of vulcanizable rubber, and vulcanizing the combination under pressure.

10. A method of uniting bodies of material, at least one of which is metallic, which comprises applying to a metallic body a mixture of products resulting from further vulcanizing solutions of soft vulcanized rubber in the presence of additional sulphur to substantially different degrees of combined sulphur, with the product of a higher degree of combined sulphur predominating, drying the mixture, applying thereto the other body of material, and vulcanizing.

11. A method of uniting metal to rubber which comprises, applying to a ferrous metal a mixture of products resulting from further vulcanizing solutions of soft vulcanized rubber in the presence of additional sulphur to different degrees of combined sulphur, one of said products having at least 15% of combined sulphur and the other vulcanized to a substantially less degree of combined sulphur, said respective products being substantially in the proportion of 2 to 1, drying the mixture, applying a body of vulcanizable rubber, and vulcanizing.

12. An integrally united composite body resulting from the vulcanization of; a body of metal; a body of rubber; and an intermediate layer comprising the deposit from a mixture of solutions of vulcanized rubber, one of which is vulcanized to a substantially greater proportion of combined sulphur than the other, and an organic softener for rubber.

13. An integrally united composite body resulting from the vulcanization of; a body of metal; a body of rubber; and an intermediate layer comprising, the deposit from a mixture of products resulting from further vulcanizing solutions of soft vulcanized rubber in the presence of additional sulphur to substantially different degrees of combined sulphur, the rubber of one of which solutions has not less than 15% of combined sulphur, and an organic softener for rubber.

14. A method of uniting metal to rubber which comprises; applying to the metal a composition comprising, a mixture of solutions of vulcanized rubber of substantially different degrees of combined sulphur, and an organic softener for rubber; drying the composition; applying a body of rubber; and vulcanizing.

15. A method of uniting metal to rubber which comprises; applying to a ferrous metal a composition comprising, a mixture of products resulting from further vulcanizing solutions of soft vulcanized rubber in the presence of additional sulphur to substantially different degrees of combined sulphur, and an organic softener for rubber; drying the composition; applying a body of rubber; and vulcanizing.

16. A method of uniting metal to rubber which comprises; applying to a ferrous metal a composition comprising, a mixture of products resulting from further vulcanizing solutions of soft vulcanized rubber in the presence of additional sulphur to substantially different degrees of combined sulphur, with the product having the highest combined sulphur predominating, and an organic softener; drying the composition; applying a body of vulcanizable rubber; and vulcanizing.

17. An integrally united composite body resulting from the vulcanization of; a body of metal; a body of rubber; and an intermediate layer comprising, the deposit from a mixture of solutions of rubber vulcanized to substantially different degrees of combined sulphur, an organic softener for rubber, and an organic accelerator.

18. An integrally united composite body resulting from the vulcanization of; a body of ferrous metal; a body of rubber; and an intermediate layer comprising, the deposit from a mixture of products resulting from further vulcanizing solutions of soft vulcanized rubber in the presence of additional sulphur to substantially different degrees of combined sulphur, with the product of a higher degree of combined sulphur predominating, an organic softener for rubber, and an organic accelerator.

19. A method of uniting metal to rubber which comprises; applying to the metal a composition comprising, a mixture of solutions of vulcanized rubber of substantially different degrees of combined sulphur, an organic softener for rubber, and an organic accelerator; drying the composition; applying a body of rubber, and vulcanizing.

20. A method of uniting metal to rubber which comprises; applying to a ferrous metal a composition comprising, a mixture of products resulting from further vulcanizing solutions of soft vulcanized rubber in the presence of additional sulphur to substantially different degrees of combined sulphur, an organic softener for rubber, and an organic accelerator; drying the composition; applying a body of vulcanizable rubber; and vulcanizing.

21. A method of uniting metal to rubber which comprises; applying to a ferrous metal a composition comprising, a mixture of products resulting from further vulcanizing solutions of soft vulcanized rubber in the presence of additional sulphur to substantially different degrees of combined sulphur, the higher degree product having at least approximately 15% of combined sulphur, an organic softener for rubber, and an organic accelerator; drying the composition; applying a body of rubber; and vulcanizing.

HARRY L. FISHER.